April 21, 1942. W. C. AGERELL ET AL 2,280,642
RADIATOR AND RADIATOR SHUTTER ASSEMBLY
Filed June 23, 1938 5 Sheets-Sheet 4
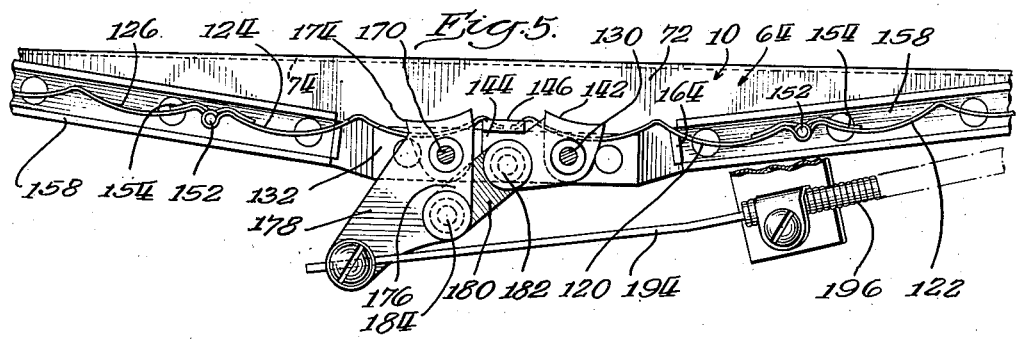
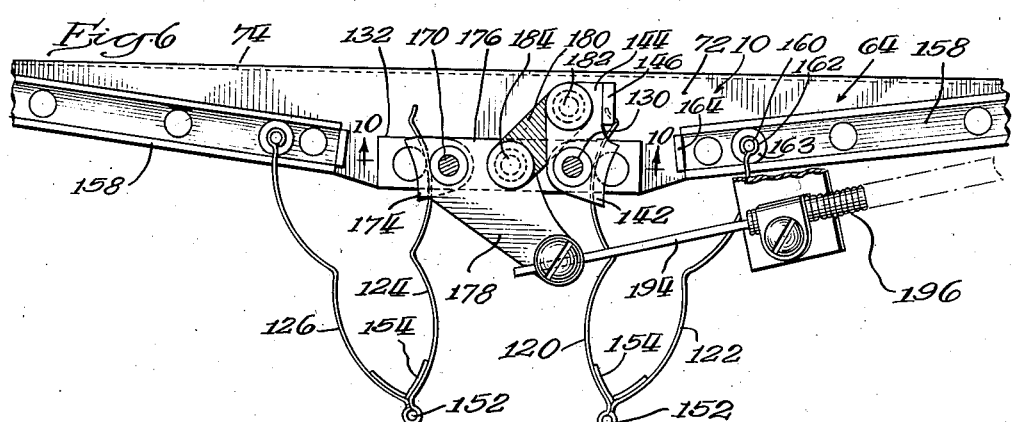
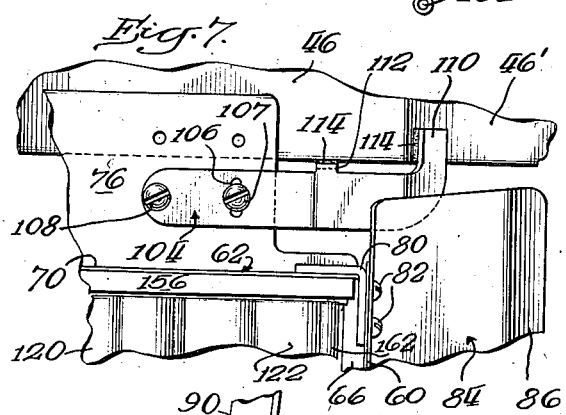
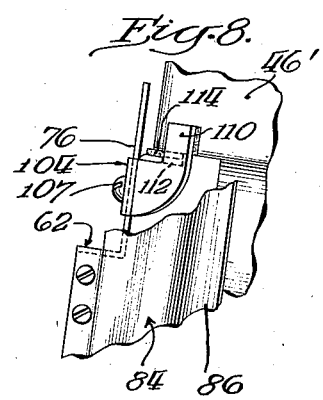
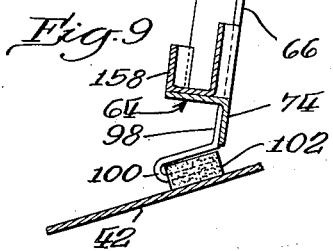
Inventors.
William C. Agerell
Arthur C. Mueller

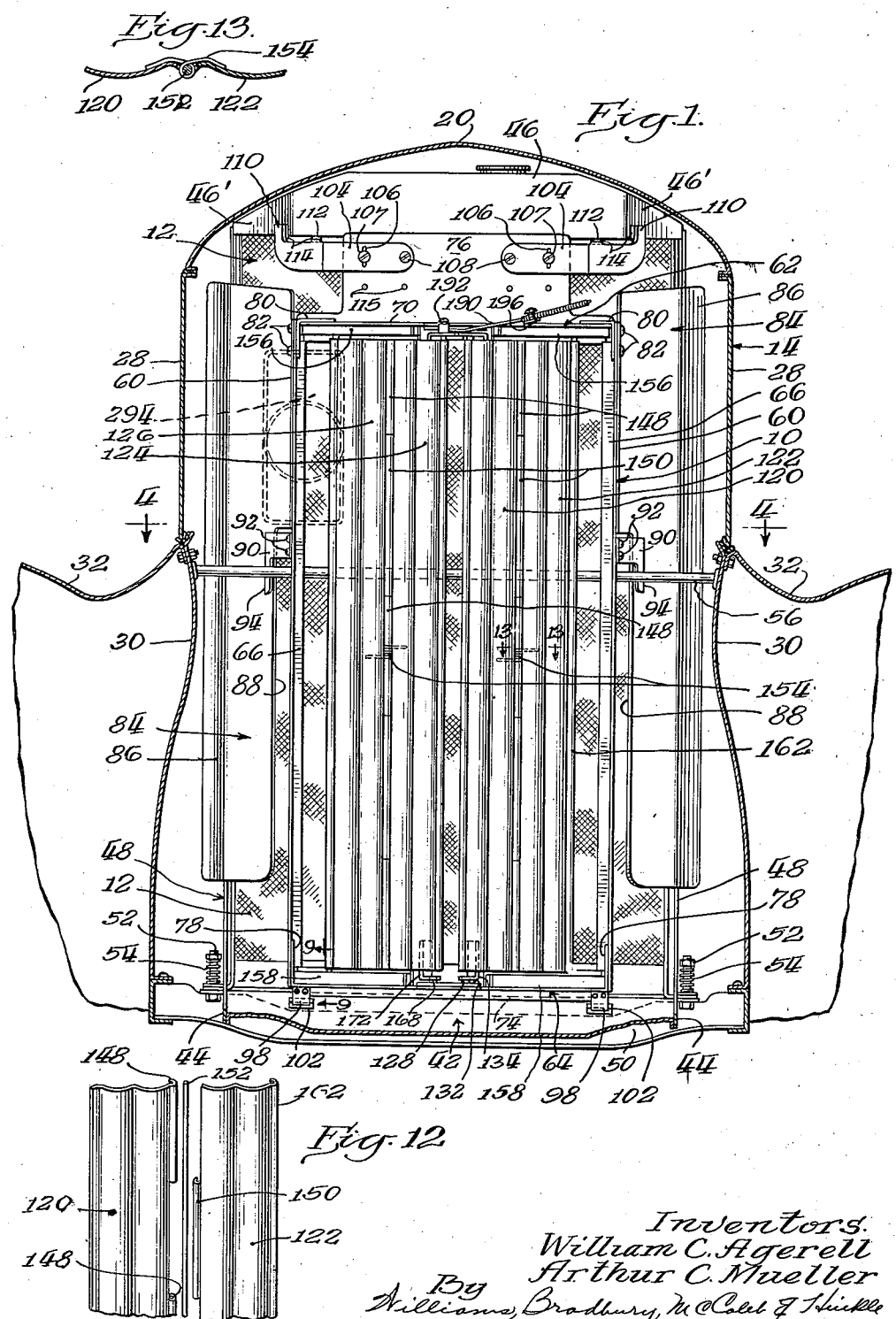

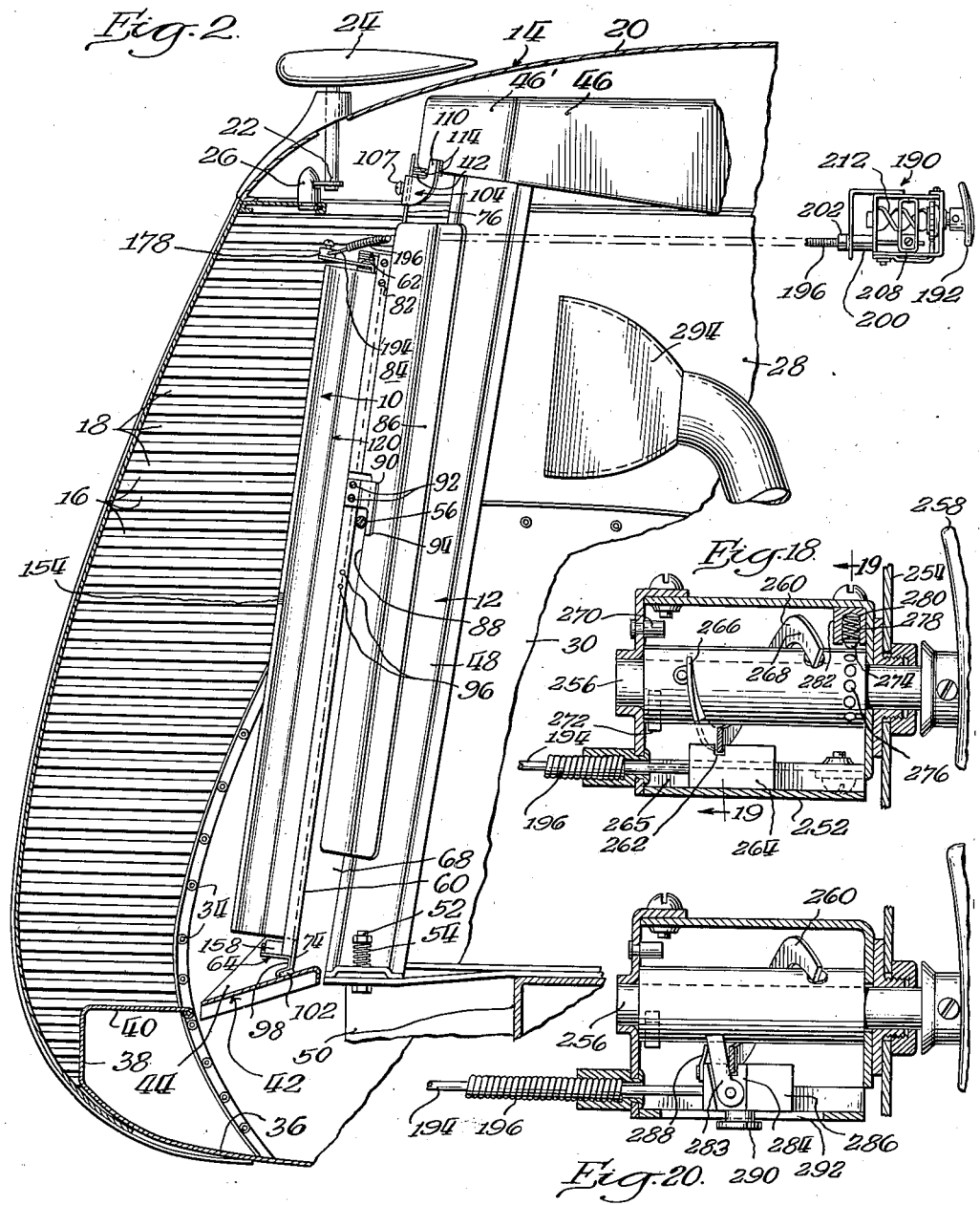

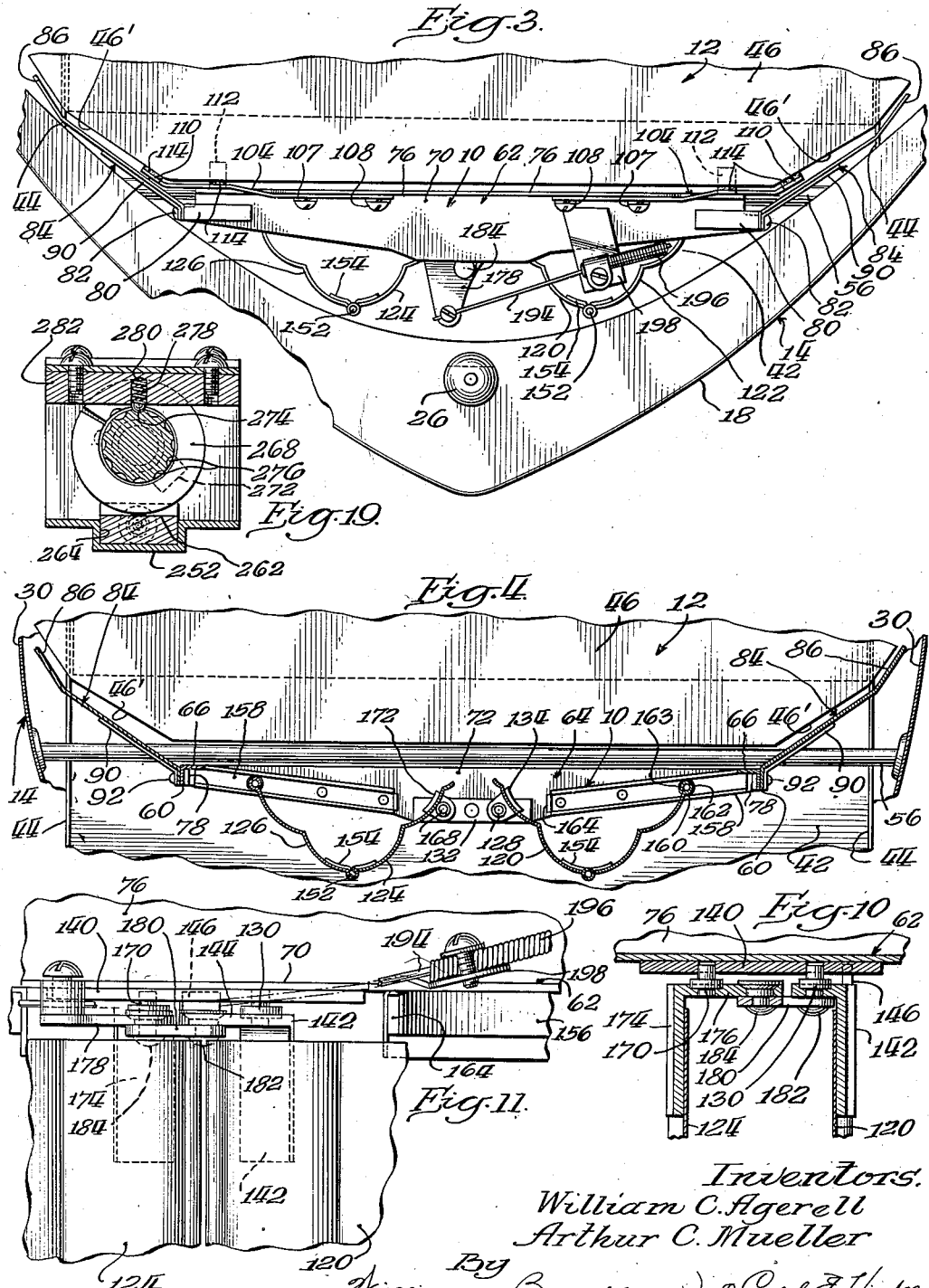

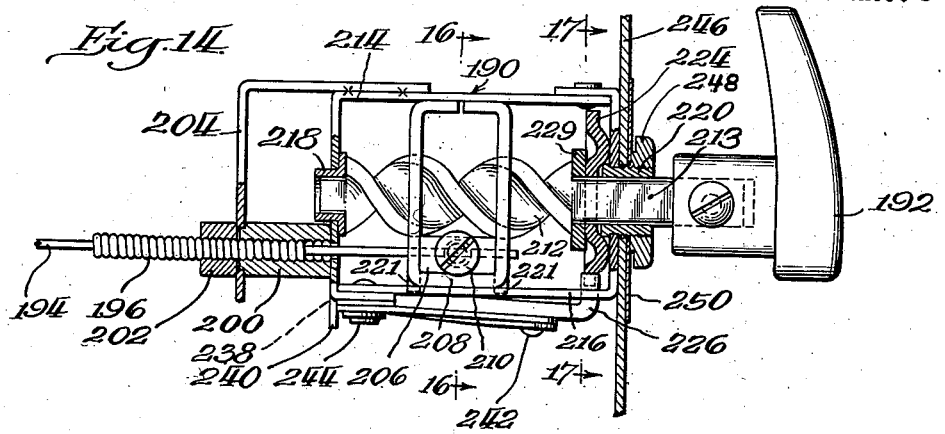
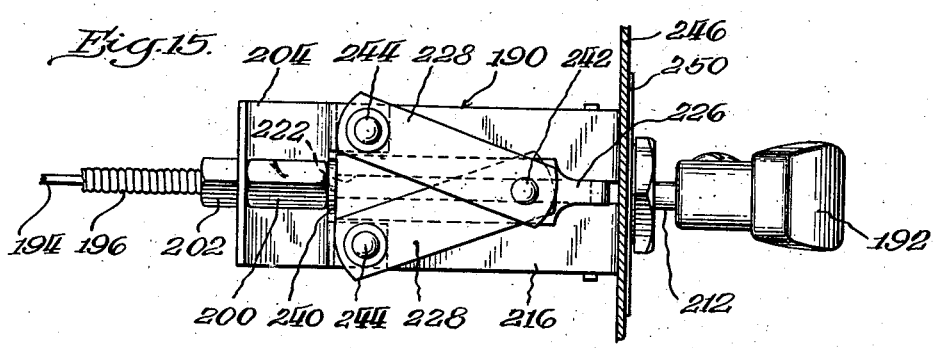
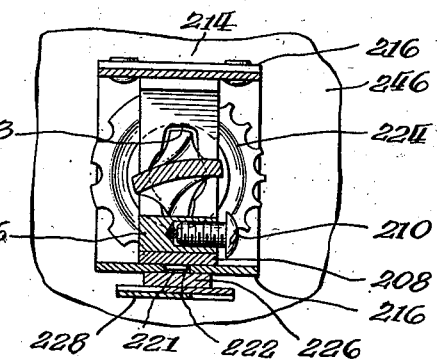
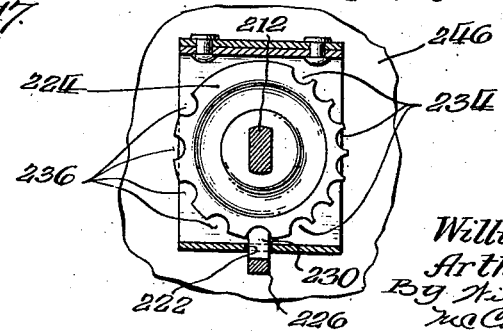

Patented Apr. 21, 1942

2,280,642

UNITED STATES PATENT OFFICE 2,280,642

RADIATOR AND RADIATOR SHUTTER ASSEMBLY

William C. Agerell and Arthur C. Mueller, Chicago, Ill., assignors to Pines Winterfront Company, Chicago, Ill., a corporation of Delaware Application June 23, 1938, Serial No. 215,504

19 Claims. (Cl. 189—62)

The present invention relates to a radiator and radiator shutter unit assembly for automobiles and other automotive vehicles, and the present application is a continuation in part of our earlier application, Serial No. 152,746 filed July 9, 1937, now Patent No. 2,170,524.

An object of the present invention is to provide a new and improved shutter unit.

A further object of the present invention is to provide an automobile radiator shutter unit comprising a fixed imperforate portion and movable shutter elements adapted to be placed within a surrounding shell having a sharp front, the shutter unit being constructed and arranged to provide a sufficient amount of and so distribute the air over the surface of the radiator that the efficiency of the cooling system remains substantially unimpaired by the addition of the shutter unit.

A further object of the present invention is to provide a shutter unit comprising fixed and movable portions in which the movable portions are adapted to be operated toward the center and front of the unit when opened, whereby the unit may be used with the modern sharp-nosed automobile fronts.

A further object of the present invention is to provide a removably mounted shutter unit adapted to be supported by a transverse tie rod, the unit being provided with vertically disposed rod-receiving slots whereby the unit may be moved in a vertical plane for mounting or dismounting and is prevented from moving longitudinally.

A further object of the invention is to provide a radiator shutter unit provided with novel structure for securing the top and bottom of the shutter-unit against undesired movement.

A further object of the invention is to provide a shutter unit and a heater intake constructed to furnish an adequate supply of air to the heater at all times.

A further object of the invention is to provide a shutter unit with novel shutter element position controlling means.

A further object of the invention is to provide a shutter unit of a type adapted to be opened against a considerable resistance with control means whereby the shutter elements may be initially opened relatively easily in predetermined relatively small steps.

A further object of the invention is to provide an improved control means for operating the shutter elements to selected positions that is adapted to change rotary into straight line movement.

A further object of the invention is to provide a new and improved control means whereby the shutter elements may be operated from one extreme position to another extreme position by a single twist of the operator's wrist.

A further object of the invention is to provide a novel control means adapted to maintain the shutter elements in selected open positions.

A further object of the invention is the provision of a new and improved shutter control unit adapted to operate the shutter through a flexible cable wherein the slack in the cable may be adjusted at the control unit.

Further objects and advantages of the present invention will become apparent from the ensuing description, in the course of which reference is had to the accompanying drawings, in which:

Fig. 1 is a substantially vertical transverse section view through an automotive vehicle showing the radiator and radiator shutter unit assembly of the present invention in elevation;

Fig. 2 is a vertical longitudinal section through an automotive vehicle, showing in side elevation the radiator and radiator shutter unit assembly, and also illustrating diagrammatically the preferred form of the novel and improved manual control means for the shutter elements and the relation of the shutter elements to the intake of the air heater;

Fig. 3 is a substantially horizontal longitudinal section through an automotive vehicle showing a top plan view of the shutter unit of the present invention;

Fig. 4 is a sectional view taken along the line 4—4 of Fig. 1;

Fig. 5 is a substantially horizontal section through the shutter unit showing the details of the shutter control mechanism when the shutter elements are in their closed position;

Fig. 6 is a view similar to Fig. 5 showing the shutter elements in their open position;

Fig. 7 is an enlarged fragmentary front elevation showing the details of the means for positioning the upper end of the shutter unit with respect to the upper tank of the radiator;

Fig. 8 is a side elevation of the details shown in Fig. 7;

Fig. 9 is an enlarged fragmentary longitudinal vertical section through the radiator shutter unit taken along the line 9—9 of Fig. 1;

Fig. 10 is an enlarged fragmentary substantially vertical transverse section taken along the line 10—10 of Fig. 6 and showing details of construction of the shutter actuating mechanism;

Fig. 11 is an enlarged fragmentary front elevation illustrating in greater detail the construction of the shutter actuating mechanism;

Fig. 12 is a fragmentary exploded view showing the construction of a hinge joining two adjacent shutter elements;

Fig. 13 is an enlarged fragmentary section taken along the line 13—13 of Fig. 1 showing details of construction of a spring provided to bias the shutter elements to their closed positions;

Fig. 14 is a longitudinal vertical section through the novel manual control means illustrated in Fig. 2;

Fig. 15 is a bottom elevation of the control means illustrated in Fig. 14;

Fig. 16 is a transverse vertical section taken along the line 16—16 of Fig. 14;

Fig. 17 is a transverse vertical section taken along the line 17—17 of Fig. 14;

Fig. 18 is a longitudinal vertical section through a modified form of control means;

Fig. 19 is a transverse vertical section taken along the line 19—19 of the control means illustrated in Fig. 18; and Fig. 20 is a view similar to Fig. 18 of a further modification of the control means.

Referring first to Figs. 1 and 2, the shutter unit of the present invention, designated as a whole by reference numeral 10, is shown in its installed position in front and spaced from the radiator 12, in which position it is removably mounted in a manner hereinafter to be described. The shutter unit, the radiator and the supporting means therefor lie and are concealed within a multiple piece structure forming a shell 14. The several parts of this shell are finished and collectively constitute the finishing piece for the radiator core.

While the specific construction of the shell forms no part of the present invention, a multiple piece structure has been illustrated and is described briefly. Before proceeding with this description it may be well to note that an integral finishing piece, such as the well known radiator shell that has been used for many years, may be substituted for the multiple piece structure here described.

In the present instance the shell 14 comprises a number of parts so constructed and arranged as substantially to encircle the radiator and radiator shutter unit and their supporting means, and to provide an open panel 16 in front of the shutter unit through which air may pass to the shutter unit and radiator core. In order to improve the external appearance of the outer shell the panel 16 is partly closed by grill work 18 of suitable design and, as shown in Fig. 2, having a relatively sharp front. The front has a substantially V-shaped horizontal section and extends farther forward at the bottom than at the top in order to conform to the positions of the radiator and shutter unit, both of which slant backward a slight amount.

The shell comprises an integral top panel 20 hinged at its rear end in a suitable manner (not shown) and is provided at its front end with a latch 22 adapted to be rotated by means of a handle 24 extending outside the panel. The latch is cooperatively associated with a slotted catch 26 secured in suitable manner to the grill work, as shown in Fig. 2. The upper portions of the side walls of the shell are formed by a pair of vertically disposed side panels 28 detachably mounted in suitable manner to supporting structure that has been omitted for the purpose of clarity. The lower ends of the side panels abut against the junction of downwardly extending skirts 30 and fenders 32 secured to each other and the chassis of the vehicle in accordance with well known principles. The grill work is secured to the side panels by a plurality of spaced bolts 34.

The bottom of the shell 14 is formed by a baffle 36 having a vertical front wall 38 and a horizontal top wall 40 and fitting snugly within the grill work 18 wherein it is mounted. The baffle, together with an apron 42 extending forwardly and downwardly from the bottom of the radiator 12 to meet the top wall 40 of the baffle, serves to direct the flow of air to the shutter and also to prevent the splashing of mud or like material into the radiator core. The apron 42 is secured in the position described by welding it to a pair of triangular supports 44 welded to the side frames of the radiator core.

The radiator core 12 and the upper radiator tank 46 may be supported upon the chassis of the vehicle in suitable manner, and in the present instance are illustrated as being supported by channeled side frames 48 to which the core is secured, as by welding. The lower ends of the side frames are provided with horizontal flanges adapted to be secured in resilient fashion to the front cross piece 50 of the chassis by bolts 52 and springs 54 surrounding the latter and biasing the side frames toward the cross piece.

The shutter unit of the present invention is removably supported in spaced relationship to the front face of the radiator core in novel manner upon the apron 42, the lower front corner of the radiator tank 46 and a transverse tie rod 56. The tie rod is located about half way between the top and bottom of the radiator core and is secured in suitable manner at its ends to the upper ends of the skirts 30. It thus serves not only as the primary positioning means for the shutter unit, but also as a means for preventing spreading of the side walls of the shell 14.

The novel shutter unit of the present invention comprises substantially imperforate fixed portions and movable shutter elements so constructed and arranged with respect to each other that the unit may be readily mounted within an enclosing shell having a sharp front, as that of the type described above. In order that the shutter elements may be readily actuated from closed to open position in a front of this type, the size of the movable portion of the unit has been made smaller than that of the radiator core, and, to avoid impairment of the efficiency of the cooling system as a whole, the fixed portion is provided with imperforate panels which serve to distribute the air flow over substantially the entire surface of the radiator core.

The shutter unit forming one of the primary features of the present invention comprises a pair of side frame members 60, a top frame member 62 and a bottom frame member 64. The side frame members are formed of 90° angle irons having their rear flanges 66 opposed to each other and, while disposed substantially parallel to the front face of the core 12, they are spaced forward therefrom to provide a compartment 68 between the shutter unit and the core.

The top and bottom frame members are formed with horizontally disposed generally triangular portions 70 and 72, respectively, with the inclined sides thereof located at the front. The bottom frame member 64 is provided with a downwardly extending rear flange 74, and the upper frame member 62 is provided with an upwardly extending rear portion 76 having a width somewhat less than that of the frame member itself and extending substantially to the bottom of the upper radiator tank 46, as shown in Fig. 1. The rear portion 76 functions, together with the radiator tank 46, to direct the air flowing through the shutter to the upper part of the radiator core and also to support tank engaging fingers described hereinafter.

The bottom frame member 64 is secured to the side frame members 60 by means of a pair of vertical extensions 78 formed integrally therewith and welded to the side frame members. The top frame member 62 is secured to the side frame members by means of a pair of right angled brackets 80 having their horizontal portions welded to the top side of the upper frame member and their vertical portions secured to the side frame members by screw bolts 82.

The shutter frame described above embraces a lesser area than the radiator core, and in order substantially to limit the flow of air to the core through the opening defined by the frame, a pair of laterally extending side wings 84 of a configuration following in general the interior of the front portion of the outer shell are secured to the side frames. The upper portions of the side wings are preferably welded to the side frames of the shutter unit and are also secured to the latter by the previously mentioned screw bolts 82. The side wings have rearwardly extending end portions 86 that fit into the space between the side walls of the radiator core and the shell 14, thus providing means for directing the flow of air over the entire core area. They are also cut away at their lower front ends, as indicated at 88, in order that the shutter unit may be removably supported by the tie rod 56.

The shutter unit is supported not only by the tie rod 56, but also by the apron 42 and the lower front corners of the upper radiator tank 46. The support is so constructed that once the shutter unit is properly mounted in front of the radiator core it can not be moved by forces to which it is normally subjected.

The shutter is secured against longitudinal displacement by the tie rod 56 which is adapted slidably to fit into an open bottom slot defined by the tie rod guide members 90 and the side frames. The guide members 90 are secured to the side frames by screw bolts 92 with the finger 94 thereof extending downward substantially parallel to the side frames. The tie rod thus bears against the rear of the side frame members and the front edges of the fingers. The side frame members are also provided with a pair of threaded openings 96 (see Fig. 2) so that the slot defining members 90 may be moved to a lower position to receive tie rods which may be located at a lower level.

The bottom of the shutter unit is resiliently supported against undesired movement by means of a pair of spaced apart resilient brackets 98 welded to the downwardly depending flange 74 of the bottom frame member. The brackets 98 comprise, as shown best in Fig. 9, a reverse bend 100 defining a rearwardly extending projection or finger adapted to receive a tubular piece of rubber 102. The rubber is maintained in frictional contact with the apron by the resiliency of the bracket which serves a purpose similar to that of a compression spring.

The upper end of the shutter unit is positioned against vertical, rearward, and sidewise movement by means of a pair of resilient fingers 104 adjustably mounted upon the upwardly extending rear portion 76 of the top frame member. The fingers are provided with arcuate slots 106 intermediate their ends and cooperating bolts 107 whereby they may be rotated about pivot bolts 108 for proper adjustment with respect to the lower corner of the radiator tank 46. The fingers are provided with vertically disposed extensions 110 adapted to engage the diagonal portions 46' of the front wall of the radiator tank for preventing rearward and sidewise movement of the shutter unit, and with horizontal rearwardly extending extensions 112 adapted to abut against the bottom wall of the radiator tank for preventing upward movement of the unit. The extensions 110 and 112 may have resilient rubber spacers 114 secured thereto in order better to prevent vibration of the shutter unit. Where the upper radiator tank lacks diagonally extending walls it is contemplated that the extensions 110 and 112 will abut against the front and bottom walls of the radiator.

The shutter unit is adapted to be used with radiator cores of various heights, as may be noted from a comparison of Figs. 1 and 7. In Fig. 1 the fingers 104 are shown supported near the top of the vertical portion 76 of the top frame member and in Fig. 7 the fingers are shown mounted at a lower level in the openings 115.

The movable portion of the shutter unit comprises a plurality of vertically disposed movable shutter elements 120, 122, 124 and 126 of a width sufficient entirely to close the opening defined by the frame in one position and are supported in novel manner for actuation into a position substantially central and forward of the opening to permit the flow of air to the radiator core. The shutter elements 120 and 122 constitute the first pair of shutter elements and elements 124 and 126 constitute the second pair of elements adapted to be operated simultaneously by a mechanism to be described shortly.

The shutter element 120 is mounted for pivotal movement about one edge thereof substantially centrally of the frame by means of a lower pivot pin 128 and an upper pivot pin 130. The lower end of the lower pivot pin is mounted in a flat strip of metal 132 secured to the top side of the lower frame member 64 and the upper end of the pin fits into a recess formed in a right angled lug 134 having its vertical portion welded to the shutter element 120 near the inner edge of the latter, as shown in Fig. 4. The upper end of pivot pin 130 is mounted in a strip of metal 140 similar to strip 132 and the lower end fits into a recess formed in a right angled lug 142 having its downwardly depending vertical portion secured to the shutter element 120. The lug 142 is provided with an integral extension 144 constituting a crank arm lying in the plane of the horizontal portion of the lug, and with an upwardly extending flange 146 adapted to strike against the strip 140 in order to prevent further movement of the shutter elements after these have been operated into their closed position.

The shutter element 122 is supported by the shutter element 120 by means of a hinge comprising beaded portions 148 and 150 formed on adjacent edges of the shutter elements 120 and 122, respectively, and a pin 152 extending through the beaded portions. The shutter elements are prevented from rattling and are biased to move to their closed position by means of a spring 154 mounted upon the hinged pin 152. The shutter element 122 is guided in its movements by a pair of channels 156 and 158 riveted, or otherwise suitably secured, to the top and bottom frame members, respectively. The rear walls of the channels have a height somewhat greater than the front walls in order that the ends of the shutter elements will abut thereagainst and thus be positively restrained from further movement even though subjected to a considerable air pressure. The shutter element 122 is guided in the channels by means of a longitudinal rod 160 secured by means of a beaded edge 162 to the shutter unit and extending into the channels. The movement of the rod 160 in the channels is made substantially frictionless by providing it with rollers 163 engaging the side walls of the channels. The rod 160 is prevented from escaping from the channels by providing the latter with end extensions 164 forming stops against which the roller 163 abuts when moved a predetermined extent.

The shutter element 124 is mounted in substantially the same manner as the shutter element 120 on a pair of pivot pins 168 and 170 having their outer ends mounted in the metallic strips 132 and 142, respectively, and their inner ends in right angled lugs 172 and 174 secured to the shutter element.

The upper lug 174 is provided with horizontal extensions 176 and 178 constituting short and long crank arms through which the shutter elements are operated, as hereinafter described. The crank arm 176 is adapted to be connected in pivotal manner to crank arm 144 by a connecting link 180 and pivot pins 182 and 184.

The shutter element 126 is hingedly supported from shutter element 124 by a hinge constructed of beaded edges 148 and 150 formed on adjacent edges of these elements and a pin 152 extending therethrough. The shutter element 126 is guided in its movement in opposed channels 156 and 158, similar in construction to the corresponding channels guiding movement of shutter element 122. Further description of the means for guiding movement of shutter element 126 is deemed unnecessary at this point because it is identical with that provided for element 122.

The shutter unit may be operated manually to selected positions from a distant control unit 190, forming an important feature of the present invention, shown generally in Fig. 2 and in detail in Figs. 14 to 17, inclusive. The control unit comprises mechanism adapted to change the rotary movement of a rotatable handle 192 into longitudinal movement of a flexible cable 194 leading from the control unit to the crank arm 178 of the shutter actuating mechanism. The cable is slidably mounted within a flexible conduit 196 fixedly secured in spaced relationship to the crank arm 178 upon a bracket 198 welded, or otherwise secured, to the top frame member 62 of the shutter unit from whence it extends to the control unit 190 mounted, preferably, upon the dashboard of the vehicle. In some cases it may be expedient to use a mechanical linkage system in place of the cable and it should be apparent to those skilled in the art that this change may be effected without difficulty and that certain advantages of the present invention may be realized with this changed construction.

In practice, it has been found essential to provide some means for readily adjusting the length of the flexible cable with respect to its associated conduit. It has been found that by varying the relative lengths of the two, the amount of slack in the cable can be controlled thereby to effect simultaneous initial movement of the shutter unit and operating handle. Heretofore, this has been accomplished by determining the relation at the forward end where the cable is attached to the crank arm 178 and the cable conduit to bracket 198. However, this construction is not desirable or satisfactory where the shutter unit is mounted within an enclosed finishing shell wherein the crank arm and bracket are relatively inaccessible. According to the present invention, these difficulties are avoided by adjustably terminating the control unit end of the conduit in a clamping means, preferably a nut 200 internally threaded to receive the conduit. When the slack of the cable has been properly adjusted, the lock nut 202 is rotated into abutting relationship to a bracket 204 secured to the control unit as by welding. It should be understood that other adjustable clamping means may be utilized in place of that specifically described. Factory adjustment of the slack may be obtained by varying the position of the cable with respect to a block 206 mounted at the lower end of a cam follower 208. A set screw 210 is provided adjustably to secure the cable to the block.

The control unit of the present invention is so constructed that only a fraction turn of the operating handle 192 is required to operate the shutter elements between their extreme open and closed positions. The construction comprises the previously mentioned cam follower 208 which is movable longitudinally of the unit by a double helical cam 212 terminating at one end in an operating shaft 213 of substantially reduced width and rectangular cross section to which the handle 192 is suitably secured. The cam is rotatably mounted within a unitary rectangular frame comprising a pair of right angle brackets 214 and 216 having opposed bushings 218 and 220 adapted to receive the reduced end portions of the cam. The cam follower is formed of a single piece of metal bent into rectangular shape. Its dimensions are such that it is adapted to move longitudinally within the confines of the frame, but cannot rotate therein. Greater positive guidance of the cam follower is obtained by providing it with a pair of downward extensions 221 adapted slidably to fit into a longitudinal slot 222 formed centrally of the bottom frame member 216. The opposite vertical ends of the cam follower are provided with apertures 223 (only one of which is shown in Fig. 16) having a generally rounded cross-shaped contour through which the cam 212 extends.

The pitch of the helical cam is such that the follower is moved its full extent by rotation thereof through an angle of approximately 270°. Accordingly, it is a relatively easy matter to control the position of the shutter elements.

Additional ease of operation is obtained by constructing the control in such manner that both the opening and closing of the shutter may be accomplished in a plurality of steps of predetermined length, and so constructing the control that the shutter may be operated to selected positions. In order to provide a finer adjustment of the shutter operation during the initial opening (or final closing) movement of the shutter, there is provided an index disc 224 affixed to and rotatable with the cam and a resilient movement restraining means, in this case a pawl 226, biased toward the disc by a pair of leaf springs 228. The disc is spaced from the cam proper by a washer 229 rotatable therewith. The forward end of the pawl terminates in a narrow curved finger 230 having a rounded end adapted to enter through slot 222 (see Fig. 17) into peripheral recesses on the disc 224 divided into two groups 234 and 236, for a purpose hereinafter described more fully. The pawl is supported for pivotal movement upon the frame by a dependent extension 240 formed integral with frame member 214 and the springs 228 which are fastened to the forward end of the pawl by a single rivet 242 and to the frame member 216 by the rivets 244. The extension 240 and rivet 242 prevent longitudinal movement of the pawl.

As stated above, the two groups of recesses are spaced different distances apart in order to provide a finer adjustment of the shutter during initial opening movement thereof. This is desirable because it is during this time that the vehicle cooling system is most critically affected by changes in the flow of air therethrough. The recesses 234 are spaced relatively close together and the recesses 236 somewhat further apart, as best illustrated in Figs. 16 and 17.

The pawl and the springs associated therewith also provide a resilient means for restraining undesired movement of the cam, cam follower and shutter when the latter is subjected to unusual pressures. While such movement is not likely to occur with the specific embodiments illustrated, it is conceivable that the air pressure to which the shutter is subjected may be great enough to close the shutter, particularly where the cam and cam follower construction is not irreversible—which is the case where slight angular movement of the cam is utilized to effect a considerable longitudinal movement of the follower. The pawl and disc construction described tends to prevent such movement.

The shutter control unit is preferably attached to a portion of the dashboard 246 of the vehicle in a manner best illustrated in Figs. 14 and 15. This portion is provided with an aperture through which the bushing 220 extends so that the bushing and operating shaft may project therethrough. The bushing 220 is threaded externally to receive a securing nut 248 whereby the unit is securely attached to the dashboard. The nut may be utilized also to secure an indicia dial 250 to the front side of the dashboard.

In the modified form of manual control means illustrated in Figs. 18 and 19, the finer adjustment during the initial opening movement of the shutter unit is accomplished by a mechanism in which the cam is rotated through unit angular increments to move the cam follower through shorter distances during such initial opening movement than during the final opening movement. One advantage of an arrangement of this nature is that the initial opening movement is effected with less force than otherwise because of the greater mechanical advantage.

The construction of the modified shutter control unit corresponds generally to that previously described. From Figs. 18 and 19, it may be seen that the cam and its associated follower are mounted within a suitable housing 252 similar in many respects to the housing 190 of the previously described modification. The housing is adapted to be secured to a portion of the dashboard 254 and rotatably to receive a cam shaft 256 adapted to be rotated by the operating handle 258. A cam 260 comprising a curved strip of metal is secured to the shaft and, as shown best in Fig. 18, it extends into a diagonal groove 262 formed in the cam follower 264 whereby the latter may be moved to various positions along a longitudinal guiding slot 265 as the shaft is rotated.

To provide the finer adjustment of the shutter elements during initial opening thereof mentioned above, one half 266 of the cam is made with a very slight curvature and the other half 268 with a considerably greater curvature. The portion of lesser curvature acts upon the cam follower when the shutter elements are nearer their closed positions, and the portion of greater curvature when the elements are nearer their open positions. In the illustrated embodiment the cam has been constructed so that the follower is moved approximately one-third the length of the slot during the first half turn of the shaft and two-thirds of the length during the final half turn of the shaft as the shaft is rotated to open the shutter. It should be understood that these values are given only for the purpose of illustration.

The rotation of the shaft is restricted to substantially a single turn by a stop 270 secured to the front wall of the casing and adapted to be engaged by a projection 272 secured to the shaft. Suitable indicating indicia (not shown) may be associated with the operating means to show the position of the shutters.

The resilient movement restraining means provided for the purpose of enabling the shutter elements to be operated to selected positions comprises a spring pressed ball 274 and a plurality of spaced indentations 276 formed on the surface of the shaft. The ball 274 and its biasing spring 278 are mounted in an opening 280 formed in a block 282 secured to one of the side walls of the casing.

It should be noted that the indentations 276 of this modification are spaced equally from each other. Thus, as the cam is constructed with portions having different curvatures, rotation of the shaft from one selected position to another results in the opening of the shutter elements through different distances just as in the previously described modification.

The modified form of manual control unit illustrated in Fig. 20 is similar to that illustrated in Figs. 18 and 19 with the exception of the movement restraining means and cam follower. In this embodiment the movement restraining means comprises a dog 283 pivotally mounted in a longitudinally extending slot 284 formed in the cam follower 286. The dog is biased into engagement with the shaft 256 by a leaf spring 288 mounted on the follower to prevent longitudinal movement of the follower in shutter closing direction with respect to the shaft except when the latter is rotated manually. Rotation of the shaft in a direction to effect closure of the shutter causes the cam 260 to engage the dog 283 thereby to turn it in a counter-clockwise direction. The dog is thus moved out of engagement with the shaft and permits the follower to move. The cam follower 286 of the present embodiment is guided in its movement by a pin 290 fitting into a slot 292 formed in the bottom wall of the casing.

A shutter unit embodying the present invention is advantageously combined with a heater air inlet 294 having a rectangular opening. The opening is located with its longer side vertically disposed and in line with one of the openings formed when the shutter is operated to its open position, as shown best in Fig. 1. It is evident from an inspection of this figure that the shutter element 126 serves to direct a considerable amount of air to the inlet even when only slightly open and an increased supply of air is supplied to the heater over the entire range of shutter opening. It should be apparent also that the vertical length of the inlet may be changed to meet varying requirements.

From the above detailed description it should be apparent that the present invention provides a shutter unit and assembly relatively simple in construction and admirably suited for use with automotive vehicles having sharp nosed fronts. The unit is readily installed in position and just as easily removed for repair. To install the unit it is only necessary to remove a portion of the surrounding shell 14 and then insert the shutter unit in place in such manner that the tie rod 56 fits into the slot formed by the tie rod guide 90 and side frame. The resilient brackets 98 at the bottom of the unit are readily forced into place and serve resiliently to support the unit upon the apron. The top is even more readily positioned by the resilient fingers 104 which are forced against the lower forward corner of the upper radiator tank by the action of the resilient brackets 98.

Once installed, the manual operating means is connected to the crank mechanism by fastening the flexible cable to the crank arm 178 and a flexible cable conduit to the bracket 196. To obtain the desired cable slack necessary to effect operation of the shutter simultaneously with the operating handle, it is only necessary to adjust the cable conduit means by means of the adjusting and locking nuts 200 and 202. If sufficient slack cannot be taken up in this manner, a further adjustment may be made by means of the set screw 210 which is utilized to secure the dashboard end of the flexible cable to the cam follower, as clearly illustrated in Fig. 14.

The shutter elements are easily moved into open position even against considerable air pressure by the manual control unit. The constructions of the various control units are such as to enable the operator to open the shutter with considerable ease as well as to open the shutter any predetermined extent.

While a preferred embodiment of the shutter unit and assembly has been described above, many modifications thereof, as well as of the control units, may be made without departing from the spirit of the invention.

We claim:

1. A radiator shutter comprising a pair of shutter elements, disposed between a radiator and its grill, having adjacent edges hinged to each other, means pivotally supporting one of said shutter elements, and means for guiding the movement of the other of said elements.

2. A radiator shutter adapted to be placed between a radiator and its grill comprising a plurality of pairs of shutter elements, means pivotally supporting one element of each pair, means hingedly supporting the other element of each pair from its corresponding pivotally supported element, means for guiding the movements of said other elements, and means acting upon a single element of each pair for actuating all said elements.

3. A radiator shutter construction constructed and arranged for mounting in a motor vehicle forwardly of its radiator including, in combination, a frame, a pair of shutter elements having adjacent edges hinged to each other, means pivotally supporting one of said shutter elements upon said frame, and means including a guide carried by said frame and a projection carried by said other of said elements adapted to slide therein for guiding the movement of said other element.

4. A vehicle radiator shutter construction, including in combination, a frame, a plurality of pairs of shutter elements, each pair having adjacent edges hinged to each other, means supporting a first element of each pair upon said frame, means including guides carried by the frame and projections carried by the second element of each pair adapted to slide therein for guiding the movement of said second element, and means for operating the shutter elements.

5. A vehicle radiator shutter construction adapted for use in vehicles having sharp nosed outer finishing shells for the radiators including a combination, a frame, two pairs of relatively long shutter elements, means pivotally supporting one element of each pair longitudinally and substantially centrally of the frame, means hingedly supporting the other element of each pair from its corresponding pivotally supported element, means mounted on the frame for guiding the movements of said other element of each pair, and means for operating said elements.

6. A shutter unit for the radiator of a motor vehicle comprising a frame, a plurality of pairs of relatively wide and substantially vertically disposed shutter elements, means supporting one element of each pair for pivotal movement about one edge thereof upon and substantially centrally of said frame, means hingedly supporting the other element of each pair from the other edge of said first element, and means including guides for the outer edges of the second element of each pair for moving the shutter elements forward and toward the center of the frame when the elements are operated to their open position.

7. An automobile radiator shutter unit comprising a plurality of pairs of shutter elements, means mounting at relatively closely spaced points one element of each pair for pivotal movement about one edge thereof, means hingedly supporting the second element of each pair from the first, means for guiding the movement of the outer edges of said second element in a straight line, and means including bell cranks having one arm secured to said pivotally mounted elements for actuating said elements about their pivot points, and means for rotating said cranks simultaneously in opposite directions about their respective pivot points for actuating said last mentioned means.

8. In combination, a shutter comprising a plurality of movable elements, means for moving said elements, means including a member movable longitudinally for actuating said last mentioned means, means including a rotatable shaft and cam for moving said member, and means including a pivotally mounted dog engageable by said cam and resiliently biased into engagement with said shaft for restraining movement of said member.

9. In combination, a shutter comprising a plurality of movable elements, means for moving said elements, means including a member movable in a straight line for actuating said last mentioned means, means including a transverse groove in said member, a rotatable shaft and a cam projecting into said groove for moving said member, and resiliently applied means restraining movement of said member.

10. In an automotive vehicle the combination including, shutter elements mounted in front of the radiator, and control means therefor including a manually operable mechanism located near the driver's compartment, a flexible cable interconnecting the mechanism and shutter elements, a conduit with a helically conformed surface for said cable substantially coextensive in length therewith, and the independently rotatable nut means threaded upon the conduit for adjusting the relative lengths of the cable and conduit at the driver's compartment.

11. A control unit for regulating means including in combination, a support, a follower adapted operatively to be connected to said regulating means mounted upon said support for longitudinal movement with respect thereto, a rotatable shaft and cam adapted to impart longitudinal movement to said member follower, said shaft and cam being so constructed that rotation of said shaft through less than one full turn moves said member follower from one of its extreme positions to the other, and means including a spring biased abutment mounted upon said support and adapted to engage a plurality of spaced apart recesses upon said shaft for positioning said regulating means at predetermined points.

12. A control unit for regulating means including in combination, a support, a cam follower adapted operatively to be connected to said regulating means mounted upon said support, complementary guiding means on said support and follower adapted to provide longitudinal movement of the follower with respect to the support, a rotatable integral helical cam shaft adapted to impart movement to said member, an index disc having a plurality of groups of spaced apart peripheral recesses thereon, a pawl mounted for pivotal movement on said support for engagement with said recesses, and spring means mounted on said support for resiliently biasing said pawl into engagement with said disc.

13. In a unit for controlling the position of remote regulating means through a flexible cable sheathed in a conduit, the combination including, a support, a member operatively connected to said cable and mounted for movement upon said support, manually operable means for imparting movement to said member, and threaded nut means rotatable upon said support engaging the conduit for securing the end of the conduit to the support in readily adjustable manner and for longitudinally shifting the conduit whereby the relative lengths of the cable and conduit may be adjusted at the unit.

14. In a control device for regulating means, the combination including, a support, a cam follower mounted upon said support for longitudinal movement and operatively connected to the regulating means, a diagonal groove formed in one surface of the follower, a shaft rotatably mounted upon said support having a peripheral cam extending into said groove, and manually operable means for rotating said shaft, said cam having portions of different pitch and said groove having a width sufficient to receive all portions of the cam.

15. A control unit for regulating means, including in combination, a support comprising a substantially rectangular open faced strip-formed frame, a cam follower mounted for longitudinal movement within the confines of said frame and adapted operatively to be connected to the regulating means, said follower comprising a substantially rectangular open frame having an external width substantially equal to the internal width of the supporting frame, whereby rotation thereof is prevented, and a cam shaft threaded through opposite ends of the follower frame and rotatably mounted in the supporting frame for imparting movement of the follower.

16. A control unit for regulating means, including in combination, a support comprising a substantially rectangular frame, a cam follower mounted within the confines of said frame and adapted operatively to be connected to the regulating means, said follower comprising a substantially rectangular frame having side defining portions spaced apart a distance substantially equal to the internal width of the supporting frame, one of said side defining portions having outward extensions and said supporting frame having a longitudinal slot adapted to receive said extensions, whereby said follower is guided for nonrotary longitudinal movement, and a cam shaft threaded through opposite ends of the follower frame and rotatably mounted in the supporting frame for imparting movement of the follower.

17. A control device for regulating means, including in combination, a support comprising a substantially rectangular frame, a cam follower mounted within the confines of said frame and adapted operatively to be connected to the regulating means, said follower comprising a substantially rectangular frame having side defining portions spaced apart a distance substantially equal to the internal width, and end defining portions spaced apart a distance substantially less than the internal length, of the frame, one of said side defining portions having outward extensions and the adjacent portion of the supporting frame having a longitudinal slot adapted to receive said extensions, whereby said follower is guided for nonrotary longitudinal movement, a cam shaft threaded through the end portions of the follower frame and rotatably mounted in the supporting frame, an index disc having a plurality of spaced apart peripheral recesses thereon fixedly mounted upon said cam shaft within the confines of the supporting frame, a pivotally mounted pawl having a portion extending through said slot into cooperative relationship with said recessed disc, and resilient means mounted upon the supporting frame for urging said pawl into engagement with said disc.

18. In a control unit for regulating means, the combination including, a support, a member longitudinally movable upon said support for actuating the regulating means, means including a rotatable shaft and a cam thereon for moving said member, and means including a pivotally mounted dog engageable by said cam and resiliently biased into engagement with said shaft for restraining movement of said member.

19. In a control unit for regulating means, the combination including, a support, a member longitudinally movable upon said support for actuating the regulating means, means including a rotatable shaft and a cam thereon for moving said member, and means including a dog pivotally mounted upon said support member engageable by said cam and resiliently biased into engagement with said shaft for restraining movement of said member.

WILLIAM C. AGERELL.
ARTHUR C. MUELLER.